United States Patent [19]

Rex

[11] 4,143,792
[45] Mar. 13, 1979

[54] AUTOMOBILE WINDSHIELD WASHING SERVICE UNIT

[75] Inventor: Roger F. Rex, Hales Corners, Wis.

[73] Assignee: Display Corporation International, Milwaukee, Wis.

[21] Appl. No.: 831,889

[22] Filed: Sep. 9, 1977

[51] Int. Cl.² .................. A47L 13/56; B65D 25/24; B65D 25/00; A47L 1/06

[52] U.S. Cl. .................. 221/97; 221/199; 220/18; 220/23.86; 220/90; 15/257.05; 15/220 R; 15/244 R; 15/245

[58] Field of Search ............ 220/18, 23.86, 85 D, 220/90; 15/260, 257.05, 220 R, 244 R, 245; 221/199, 97

[56] References Cited

U.S. PATENT DOCUMENTS

| 1,697,654 | 1/1929 | Jantzen | 221/199 X |
| 1,748,789 | 2/1930 | Orkin | 220/90 X |
| 2,663,889 | 12/1953 | Fuglie | 15/260 X |
| 3,299,458 | 1/1967 | Royalty | 15/260 |

Primary Examiner—Allen N. Knowles

[57] ABSTRACT

Disclosed herein is a device for holding automobile windshield washing apparatus. The device includes a bin having an open upper end, a lower closed end, and a back panel which tapers generally inward to attribute a restricted width to the closed end. The device also includes a body having an upper and lower portion. A paper towel dispenser is attached to the upper portion. The lower portion of the body includes a pocket into which the bin is adapted to be removably supported in a generally upright position giving access to the interior of the bin. In one embodiment, the body includes a plurality of generally vertically stacked pockets, each holding a bin.

14 Claims, 2 Drawing Figures

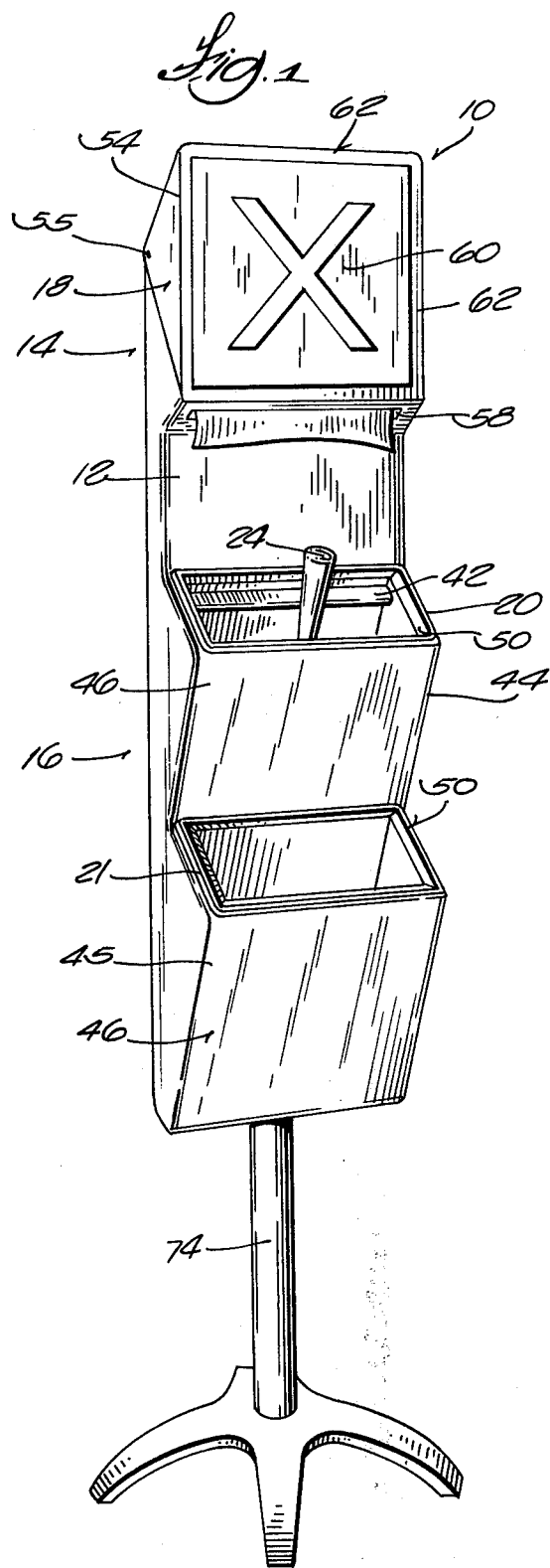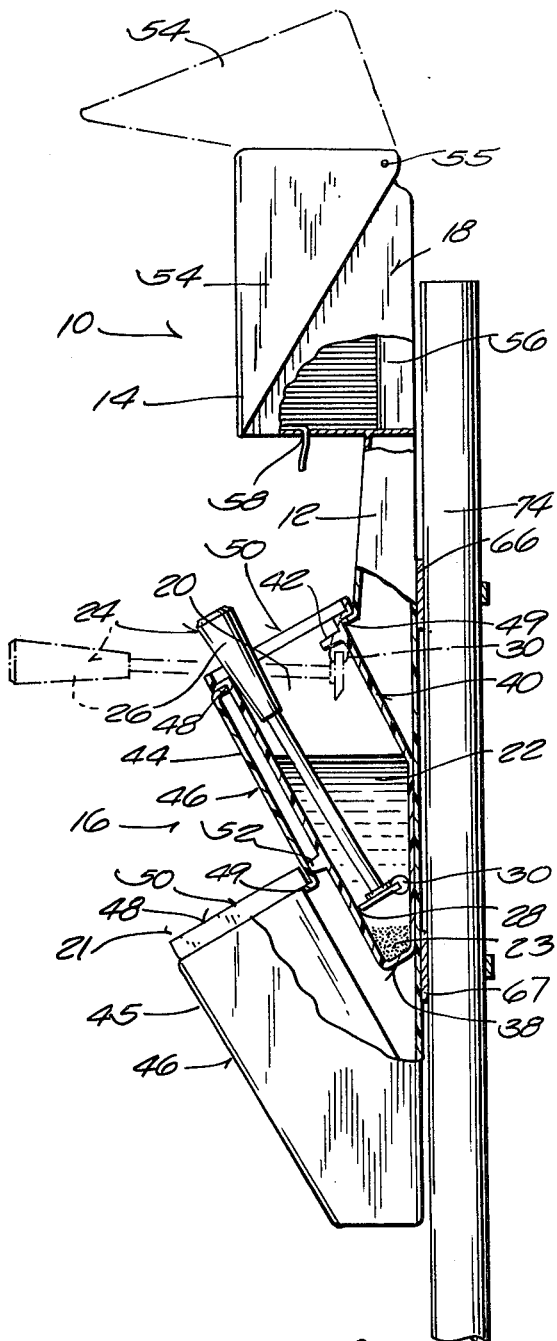

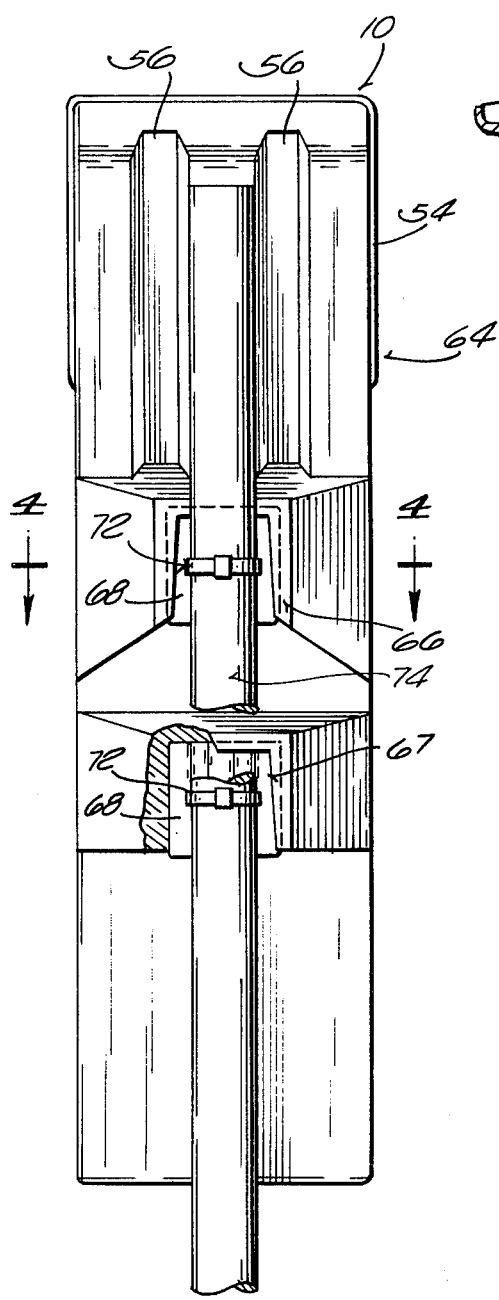
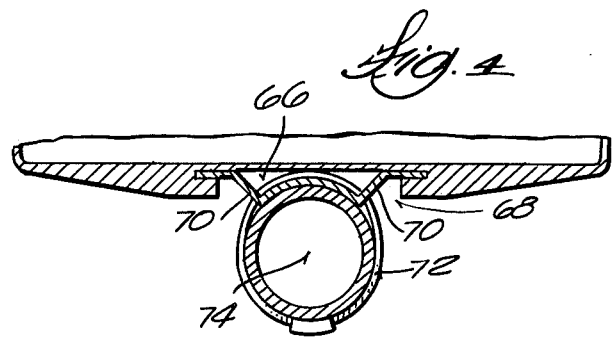
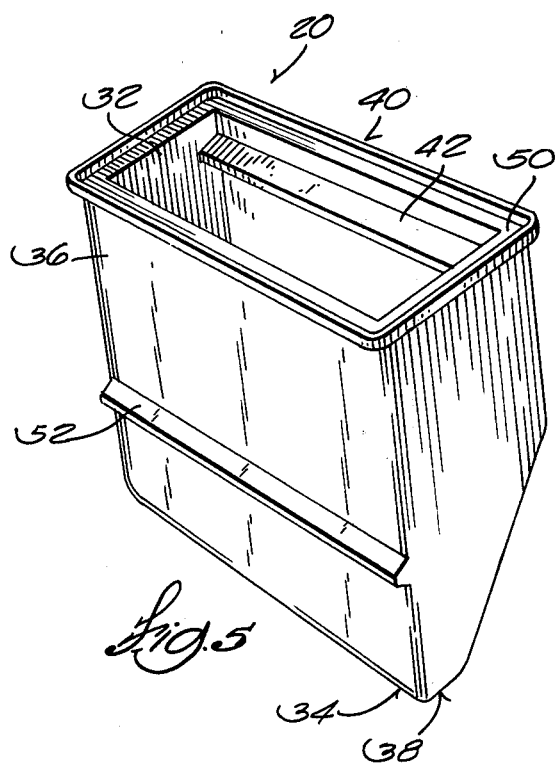

AUTOMOBILE WINDSHIELD WASHING SERVICE UNIT

BACKGROUND OF THE INVENTION

The invention relates generally to devices used in and around the service islands of gasoline stations and more particularly, to an integral windshield washing service device that includes a towel dispenser and a plurality of multi-purpose bins and which is capable of being stored in a secured area of the gasoline station during nonbusiness hours.

SUMMARY OF THE INVENTION

The invention resides in a device for holding automobile windshield washing apparatus, which device comprises a bin having an open upper end and a lower closed end spaced away from the open end. The bin is defined by a vertical front panel extending from the open end to a bottom panel, which bottom panel defines the lower closed end. The bin panels converge from the open to the closed end so that the lower closed end is restricted in width and will prevent contact between windshield washing apparatus, such as a squeegie, and the bottom panel. In this manner the working portion of the squeegie is held above and out of contact with dirt and the like which will have settled into the closed end of the bin.

In its preferred embodiment, the device further has body means having an upper and lower portion. The lower portion includes a plurality of pockets generally stacked one above the other, and also includes a plurality of the bins corresponding in number to the pockets with one bin removably supported in each pocket, at least one of the bins having the configuration described above. The upper portion of the body means includes towel dispensing means, with a lid portion hingedly attached for easy loading of towels therein.

Also in its preferred embodiment, the device includes a mounting stand on which the body means is supported and in a manner which removably attaches the body means to the mounting stand.

One of the objects of the invention is to provide a bin that tapers inwardly to a narrow bottom so that a conventional squeegie placed in the bin is not permitted to rest on the bottom. This feature permits dirt to accumulate in the bottom protion of the bin, and allows the squeegie to rest in the bin but out of contact with that dirt.

Another object of the invention is to provide body means for supporting a plurality of bins, which body means also includes a paper towel dispenser.

These features provide in one integral device accommodation of all elements necessary to an automobile windshield washing service.

Yet another object of the invention is to provide means for removably attaching the body means to a stand so that the body means is a portable unit that can be placed in a secured place during nonbusiness hours to protect the unit from vandalism and theft.

Other objects and advantages will be pointed out in, or be apparent from, the specification and claims, as will obvious modifications of the embodiments shown in the drawings.

DESCRIPTION OF THE DRAWINGS

FIG. 1 is a perspective view of a device for holding automobile washing apparatus embodying this invention;

FIG. 2 is a side and partly fragmentary view of the device shown in FIG. 1;

FIG. 3 is a back and partly fragmentary view of the device shown in FIG. 1 illustrating the means for mounting the device on a mounting stand;

FIG. 4 is an enlarged sectional view of the mounting means taken generally along line 4—4 in FIG. 3; and FIG. 5 is an enlarged perspective view of a bin embodying various of the features of the invention.

GENERAL DESCRIPTION

With reference to FIG. 1, a device 10 for holding windshield washing apparatus is illustrated as embodying various features of the invention. The device includes a body 12 which, in its illustrated and preferred configuration, has upper and lower portions 14 and 16. The upper portion 14 of the body includes paper towel dispensing means 18 and the lower portion 16 of the body is adapted to accommodate one or more multi-purpose bins. As illustrated two bins 20 and 21 are provided.

FIG. 5 illustrates the tapered shape of the bin 20 that is provided by the invention. However, it is to be appreciated that although bin 20 will be described in detail, the features that define the tapered shape of bin 20 are identical to those that define the tapered shape of bin 21. The bin 20 includes an open upper end 32 and a lower closed end 34 spaced from the upper end 32. The interior of the bin is defined by a vertical front panel 36 extending as a straight panel from the upper end 32 to a bottom panel 38. A bottom panel 38 defines the lower closed end 34. The interior of the bin 20 is further defined by a back panel 40 located opposite to and spaced from the front panel 36. It too extends from the upper end 32 to the lower end 34, but adjacent the bottom panel 38 the back panel of the bin is tapered inwardly toward the front panel 36.

Either of the multi-purpose bins 20 and 21 can be used as a receptacle for spent paper towels. Likewise, either of the bins 20 and 21 can be used to hold conventional windshield washing apparatus which is to be immersed in washing solvent 22.

While various kinds of washing apparatus can be used, the illustrated apparatus (FIG. 2) is a conventional squeegie 24 having a handle member 26, a sponge member 30, and a laterally extending oppositely directed flexible wiping member 28 directed oppositely relative to the sponge member 30. As shown in FIG. 2, the tapering back panel 40 provided by the invention results in the bottom of the bin having a restricted width which prevents the sponge 30 and wiping members 28 of the squeegie 24 from making contact with the bottom panel 38 of the bin 20. Therefore, dirt 23 suspended in the washing solvent 22 settles to the lower closed end 34 of the bin 20, and the squeegie member 24 is held above and free from the dirt 23.

If the bin is intended for use primarily as a holder of windshield washing apparatus, the invention provides an added feature to the preferred embodiment, as shown in FIG. 5. The bin 20 includes a lip 42 that extends laterally inward from the back panel 40 near the upper end 32. The lip 42 is located so that the squeegie can be laid on the top edge of panel 36 and the sponge member 30 of the squeegie compressed against the lip 42 (as illustrated by the dotted line showing in FIG. 2) to wring out excess washing solvent 22 before use.

As is best illustrated in FIG. 2, the lower portion 16 of the body 12 includes means defining pockets 44 and 45 in which the bins 20 and 21 are removably supported in a generally upright position to give access to the interior of the bins. While the number of pockets 44 and 45 in the body 12 can vary, in the illustrated embodiment two pockets 44 and 45 are generally stacked one above the other with a bin 20 and 21 in each of the respective pockets 44 and 45. As illustrated, the upper bin 20 includes the lip 42 and is primarily intended to hold windshield washing apparatus, while the lower bin 21 does not include the lip 42 and is intended to be used primarily as a receptacle for spent paper towels. It is to be understood, however, that both bins 20 and 21 could perform either function.

Each pocket 44 and 45 has an outwardly sloping front panel 46 and a top panel 48 generally sloped perpendicular to the front panel 46. Top panel 48 is actually a lip extending around and defining a vertical opening 49 in which a respective one of the bins 20 and 21 is received. Referring back to FIG. 5, according to the preferred embodiment both the bins 20 and 21 include certain structural features that adapt the bins to be slidably supported in each pocket 44 and 45. A support lip 50 extends laterally outward around the upper end 32 of the bin. This support lip 50 is adapted to make contact with the top panel 48 of the pockets 44 and 45 when the bins 20 and 21 are slid therein. In addition, a spacing ledge 52 is provided and extends outwardly from the front panel 36 of the bin. The spacing ledge 52 is adapted to contact the inner face of the sloping front panel 46 of the pockets 44 and 45 to hold the bins 20 and 21 away from the front panel 46 and thereby stabilize the bins 20 and 21 in the pockets 44 and 45.

The towel dispensing means 18 attached to the upper portion 14 of the body 12, includes a lid portion 54 hingedly attached to the body at pivots 55. The towel dispensing means 18 also includes an elongated slot 58 through which conventional paper towels are dispensed. The towel dispensing means 18 also includes a pair of towel holding ribs 56 located in the interior of the towel dispensing means 18, and in relative spaced relationship to position conventional sized paper towels over the slot 58. In its preferred embodiment, the towel dispensing means 18 has means for attaching advertising copy 60 to the lid portion 54 of the dispensing means 18. While the means for attaching advertising copy can vary, in its illustrated embodiment, elongated aluminum strips 62 are provided behind which the advertising copy 60 is removably supported.

Body 12 further includes a back panel 64, as shown in FIG. 3. The back panel 64 contains at least one but preferably two generally inverted U-shaped mounting recesses 66 and 67. The number of mounting recesses 66 and 67 can vary according to the size of the body 12 and they are spaced generally one above the other.

A mounting bracket 68 has a shape corresponding to the generally inverted U-shaped recesses 66 and 67 (see FIGS. 3 and 4), and corresponds in number with the number of U-shaped recesses. The mounting brackets 68 are adapted to be received in the recesses 66 and 67 so that the body 12 hangs on the brackets 68, but is readily removable from the bracket 68 by lifting the body upwards.

While the mounting brackets 68 can be affixed to any suitable surface, in the illustrated embodiment the brackets are fixed to an upright stand 74. Each bracket 68 includes a pair of slots 70 through which a flexible wire band 72 is passed, thereby permitting the bracket 68 to be connected to a conventional cylindrical upright mounting stand 74. As is readily apparent, however, the bracket 68 could also be affixed to the upright surface of the wall.

This feature allows easy removal of the body 12 for storage in a secured area during nonbusiness hours to protect the body 12 from vandalism and theft.

In its preferred embodiment as best shown in FIG. 1 and FIG. 3, the body 12 is molded in a lightweight, one-piece construction with the U-shaped mounting recesses 66 and 67, the towel spacing ribs 56, the pockets 44 and 45, and the towel dispensing means 18 formed as integral parts of the body member 12.

Although but one embodiment of the present invention has been illustrated and described, it will be apparent to those skilled in the art that various changes and modifications may be made therein without departing from the spirit of the invention or from the scope of the appended claims.

I claim:

1. A device for holding automobile windshield washing apparatus, which device comprises, in combination,
   a bin having an open upper end and a lower closed end spaced from said open end;
   said bin being defined by a generally straight front panel extending from said open end to a bottom panel;
   said bottom panel defining said lower closed end; and
   a back panel opposite to and spaced from said front panel;
   said back panel including a generally straight upper end section extending from said upper end portion toward said bottom panel and a bottom end section extending between said upper end section and said bottom panel, said bottom end section being tapered inwardly toward said front panel adjacent to said bottom panel to provide a restricted width in the area of said bottom panel for preventing contact between said windshield washing apparatus and said bottom panel.

2. A device as recited in claim 1 wherein said bin further comprising means adjacent said open end defining a lateral projection extending from said back panel into said bin against which said washing apparatus can be pressed to remove excess washing solvent from said washing apparatus.

3. A device for holding automobile windshield washing apparatus, which device comprises, in combination,
   a bin having an open upper end and a lower closed end spaced from said open end;
   said bin being defined by a front panel extending from said open end to a bottom panel;
   said bottom panel defining said lower closed end;
   a back panel opposite to and spaced from said front panel and extending from said open end to said bottom panel;
   one of said front panel and said back panel being tapered inwardly toward the other panel adjacent to said bottom panel to provide a restricted width in the area of said bottom panel for preventing contact between said washing apparatus and said bottom panel;
   body means for holding said bin; and said body means including means defining a pocket into which said bin is adapted to be removably supported in a generally upright position giving access to the interior of said bin.

4. A device as recited in claim 3 wherein
said body means includes a plurality of said means defining a plurality of said pockets and said pockets are generally stacked one above the other;
and also includes a plurality of bins corresponding in number to the number of said pockets and with one bin located in each pocket.

5. A device as recited in claim 4 in which
each pocket in said plurality of pockets includes a sloping front panel having an interior surface and said bins further include a spacing ledge projecting from said front panels of said bins to engage said pocket front panels to hold said bin away from said interior surface.

6. A device as recited in claim 5 in which
each pocket contains a top panel generally sloped perpendicular to said front panel;
and said bin further includes a support lip extending laterally outward from said bin upper end;
said lip adapted to make supporting contact with said top panel of said pocket when said bin is slid therein.

7. A device as recited in claim 3 wherein
said body means includes an upper and lower portion;
said pockets being located in said lower portion;
and further including paper towel dispensing means attached to said upper portion.

8. A device as recited in claim 7 in which said paper towel dispensing means further includes two towel holding ribs located in the interior of said dispensing means, said ribs being generally spaced relative to each other to position conventional sized paper towels within said dispensing means.

9. A device as recited in claim 7 wherein said paper towel dispensing means includes a lid portion hingedly attached to said body for easy access to the interior of said dispensing means for placement of towels therein.

10. A device as recited in claim 7 wherein said lid portion of said towel dispensing means has mounting means for attaching advertising copy thereto.

11. A device as recited in claim 3
wherein said body means further includes a back panel,
including mounting means for said body means and which mounting means comprises:
means defining a generally inverted U-shaped recess in said back panel; and
a mounting bracket having shape corresponding to said generally inverted U-shaped recess and receivable in said recess so that with said bracket fixed said body hangs on said bracket but is removable therefrom by lifting upwards.

12. A device for holding automobile windshield washing apparatus comprising:
a bin having an open upper end, a lower closed end spaced from said open end;
said bin being defined by a front panel extending from said open end to a bottom panel and said bottom panel defining said lower closed end;
a back panel opposite to and spaced from said front panel and being tapered inwardly toward said front panel adjacent said bottom panel;
body means including upper and lower portions, a back panel, and further including means for defining a plurality of pockets generally stacked one above the other in said lower portion;
a plurality of said bins corresponding in number with the number of said pockets and one of said bins being removably supported in a generally upright position in each of said pockets;
towel dispensing means attached to said upper portion, said towel dispensing means including an interior portion for receiving paper towels, a lid portion hingedly attached to said body means for access to and to cover said interior; and
mounting means for said body means comprising means defining a plurality of generally inverted U-shaped recesses located in said back panel, and a plurality of mounting brackets corresponding in number with said recesses, said brackets having a shape corresponding to the shape of said recess and receivable in said recesses so that with said brackets fixed said body hangs on said bracket but is removable therefrom by lifting upwards.

13. A device as recited in claim 12 wherein at least one bin in said plurality of bins further includes a lip laterally extending inwardly from said back panel adjacent said open end, said bin adapted for holding a washing squeegie having a handle, a sponge member, and a laterally extending oppositely directed flexible wiping member, said lip adapted to have said sponge member pressed thereagainst for removing excess washing solvent from said sponge member prior to use.

14. A device as recited in claim 13 wherein said device is molded with said recesses, said pockets, and said towel dispensing means forming an integral part of said body means.

* * * * *